United States Patent [19]

Shona

[11] Patent Number: 5,790,885
[45] Date of Patent: Aug. 4, 1998

[54] METHOD FOR CONTROLLING IC CARD READER/WRITER TO TRANSMIT SAME CHARACTER FRAME UPON RECEIVING ECHO BACK CHARACTER INDICATING AN ERROR EXISTS IN RECEIVED CHARACTER FRAME

[75] Inventor: Yoshihiro Shona, Tokyo, Japan

[73] Assignee: Oki Electric Industry Co., Ltd., Tokyo, Japan

[21] Appl. No.: 411,808

[22] PCT Filed: Sep. 8, 1994

[86] PCT No.: PCT/JP94/01482

§ 371 Date: Apr. 10, 1995

§ 102(e) Date: Apr. 10, 1995

[87] PCT Pub. No.: WO95/07515

PCT Pub. Date: Mar. 16, 1995

[30] Foreign Application Priority Data

Sep. 10, 1993 [JP] Japan ..................... 5-225779

[51] Int. Cl.$^6$ ..................... G06F 11/00; G06F 15/80
[52] U.S. Cl. ..................... 395/825; 395/185.01; 371/48
[58] Field of Search ..................... 395/821, 825, 395/849, 850, 851, 891, 800, 309, 310, 311, 185.01, 185.02, 185.03, 185.04, 185.05; 371/32, 33, 34, 47.1, 48, 49.1; 235/379, 380

[56] References Cited

U.S. PATENT DOCUMENTS

| | | | |
|---|---|---|---|
| 4,845,717 | 7/1989 | Iijima | 372/60 |
| 4,862,501 | 8/1989 | Kamitake et al. | 380/50 |
| 4,939,353 | 7/1990 | Iijima | 235/438 |
| 5,101,410 | 3/1992 | Niimura et al. | 395/183.21 |
| 5,161,231 | 11/1992 | Iijima | 395/800 |
| 5,369,760 | 11/1994 | Iijima | 395/185.01 |
| 5,414,835 | 5/1995 | Iijima | 395/821 |

FOREIGN PATENT DOCUMENTS

| | | |
|---|---|---|
| 2-158825 | 6/1990 | Japan. |
| 4-155488 | 5/1992 | Japan. |

OTHER PUBLICATIONS

International Standard, "Identification Cards –Integrated Circuit(s) Cards With Contacts", ISO/IEC/7816–3, Part 3: Electronic Signals and Transmission Protocols.

*Primary Examiner*—Moustafa M. Meky
*Attorney, Agent, or Firm*—Wenderoth, Lind & Ponack

[57] ABSTRACT

The present invention provides a method of controlling an IC card reader/writer which is low in cost and simple in structure using a UART which is a universal transmission circuit. A transmission line and a receive line of the UART are directly connected to each other for use as an SIO line of said IC card. In a command transmission/receive control, at the time of transmission processing the same character as a preceding one is transmitted when a framing error is detected and a next character is transmitted when an echo back is normally received upon reception of an echo back character after transmission of one character. At the time of a succeeding receive processing, the same command processing is executed again upon termination of the transmission/receive processing when a parity error is generated in a received character.

11 Claims, 9 Drawing Sheets

METHOD FOR CONTROLLING IC CARD READER/WRITER TO TRANSMIT SAME CHARACTER FRAME UPON RECEIVING ECHO BACK CHARACTER INDICATING AN ERROR EXISTS IN RECEIVED CHARACTER FRAME

TECHNICAL FIELD

The present invention relates to an IC card reader/writer for controlling an operation to read data from an IC card and an operation to write data in the IC card, etc., for example, meeting a standard of the ISO (International Standard Organization), etc. and a method of controlling the same.

BACKGROUND TECHNOLOGY

In a technical field of the IC card, there are standards which are described in the following literature.

Literature: ISO (International Standard Organization) and IEC (International Electrotechnical Commission) 7816-3, 1989 (E).

In a prior art method of controlling an IC card reader/writer, a command transmission/receive processing is executed for an IC card meeting an asynchronous half duplex character transmission protocol (transmission rule) T=0 (hereinafter referred to as T=0 protocol) as disclosed in the aforementioned literature.

FIGS. 2(a) and 2(b) are views showing a data transmission processing for the IC card. Both FIGS. 2(a) and 2(b) show respectively the status of a serial input/output line (hereinafter referred to as an SIO line) for executing a data transmission between the IC card reader/writer and the IC card.

According to the T=0 protocol as disclosed in the aforementioned literature, one character frame comprises a start bit C1, a character data C2 of 8 bits, a parity bit C3 and two stop bits C4, namely, it comprises 12 bits in total. The IC card reader/writer transmits this character to the IC card by way of the SIO line.

In such a character transmission, if a parity error is generated in a character DATAi which is transmitted from the IC card reader/writer, a receiver outputs an error signal C5 on the SIO line during a guard time after the parity bit C3, as shown in FIG. 2(b). (The SIO line is normally pulled up to "H" level. Accordingly, the error signal C5 is issued by changing the SIO line to "L" level). A transmitter checks the SIO line upon transmission of the parity bit C3 and transmits the same character DATAi again when an error signal is detected. If the parity error is not generated, the transmitter outputs a next character $DATA_{i+1}$ after a guard time, as shown in FIG. 2(a).

In FIG. 2(a), there is not specified a time until the next character is transmitted upon termination of the transmission of the stop bit C4 (after the guard time). If the start bit C1 is transmitted immediately after the guard time, the SIO line is changed to "L" level. If the start bit C1 is not transmitted immediately after the guard time, the SIO line keeps "H" level. Accordingly, the SIO line status after the guard time is shown by solid lines and dotted lines in FIG. 2(a).

However, in the prior art method of controlling the IC card reader/writer, a software has executed the counting of bits among characters and the transmission/receive of the character frame, etc. in order to implement the specification of the T=0 protocol. Accordingly, a program becomes complex, which requires a large capacity memory (e.g., ROM) for storing the program therein.

It is an object of the present invention to provide an IC card reader/writer and a method of controlling the same which solved the aforementioned problems in that the program becomes complex, and hence, a large capacity memory is required.

DISCLOSURE OF THE INVENTION

To achieve the above object, the invention provides a method of controlling an IC card reader/writer for executing a command processing for an IC card under a program control, the method comprising directly connecting a transmission line and a reception line of a serial data transmission means to each other for executing a parallel/serial mutual conversion between transmission and receive data under the program control or connecting the transmission and receive lines to each other in such a way as to return an echo back character by way of a gate means so that the transmission and receive lines serve as a serial input/output line of the IC card, wherein a data transmission processing is executed at the time of sending data upon reception of the echo back character which is returned from the transmission line by way of the receive line after transmission of one character by transmitting the same character again in case a framing error is generated upon reception of the echo back character and by transmitting a next character in case the framing error is not generated and a data receive processing is executed at the time of receiving data by executing again the same command processing as a presently executing command processing upon termination of the same in case a parity error is generated in a received character.

BEST MODE FOR CARRYING OUT THE INVENTION

[First Embodiment]

Figure 3:
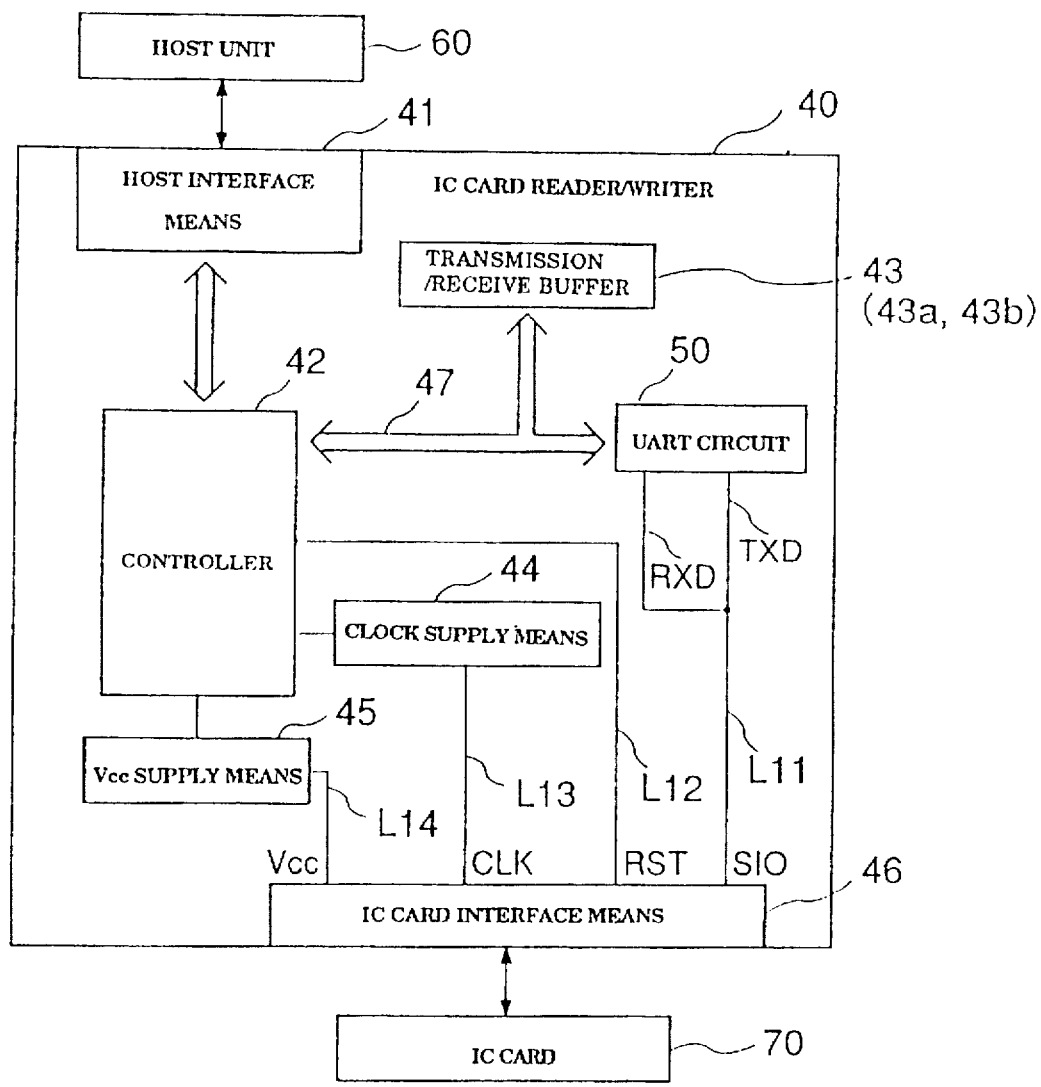
FIG. 3 is a block diagram showing an arrangement of an IC card reader/write according to the first embodiment of the invention.

FIG. 3 is a block diagram showing an arrangement of an IC card reader/writer according to a first embodiment of the invention. An IC card reader/writer 40 is connected to a host unit 60 comprising a personal computer, etc. and has a function to execute a command transmission/receive processing for an IC card 70 meeting a T=0 protocol as disclosed in the aforementioned literature. The IC card reader/writer 40 includes a host interface means 41 such as an RS-232C interface, etc. for interfacing with the host unit 60. The host interface means 41 is connected to a controller 42 comprising a microprocessor, etc. for controlling the entire IC card reader/writer 40. The controller 42 comprises a ROM in which a control program for executing the command transmission/receive processing, etc. is stored, a RAM for storing data therein, a CPU for executing the command transmission/receive processing, etc. under the control program, a transmission pointer TP, a receive pointer RP and a receive NG flag RNGF, etc.

The controller 42 is connected to a transmission/receive buffer 43 comprising a transmission buffer 43a and a receive buffer 43b for temporarily storing the transmission/receive data therein by way of a data bus 47. The controller 42 is also connected to a clock supply means 44 which supplies a clock to the IC card 70, a Vcc supply means 45 which supplies a power potential Vcc to the IC card 70, and an IC card interface 46 for transferring signals between it and the IC card 70. The IC card interface 46 is connected to an SIO line L11, an RST line L12 connected to the controller 42, a CLK line L13 connected to the clock supply means 44, and a Vcc line L14 connected to the Vcc supply means 45.

It is a noteworthy point of the IC card reader/writer 40 of the first embodiment that a serial data transmission means which executes exclusively a serial data transmission is connected to the controller 42 by way of the data bus 47. It is a specially noteworthy point that a universal asynchronous receiver transmitter (UART) circuit 50 having, for example, a transmission line TXD and a reception line RXD, which are respectively directly connected to the SIO line L11, is used as the serial data transmission means.

The UART circuit 50 is controlled by a control signal CS which is issued from the controller 42. The UART circuit 50 has a data transfer function for receiving a parallel data from the controller 42 by way of the data bus 47, converting the received parallel data to a serial data, and transmitting the converted serial data to the transmission line TXD, and vice versa, namely for receiving a serial data from the receive line RXD, converting the received serial data to a parallel data, and transmitting the converted parallel data to the controller 42 by way of the data bus 47, wherein the transmission operation and the receive operation are executed independently of each other so as to execute a whole duplex transmission. The transmission line TXD and the receive line RXD of the UART circuit 50 are directly connected to each other and the thus connected lines are connected to the SIO line L11, so that the transmission data is echoed back as it is and can be received again.

Figure 4:
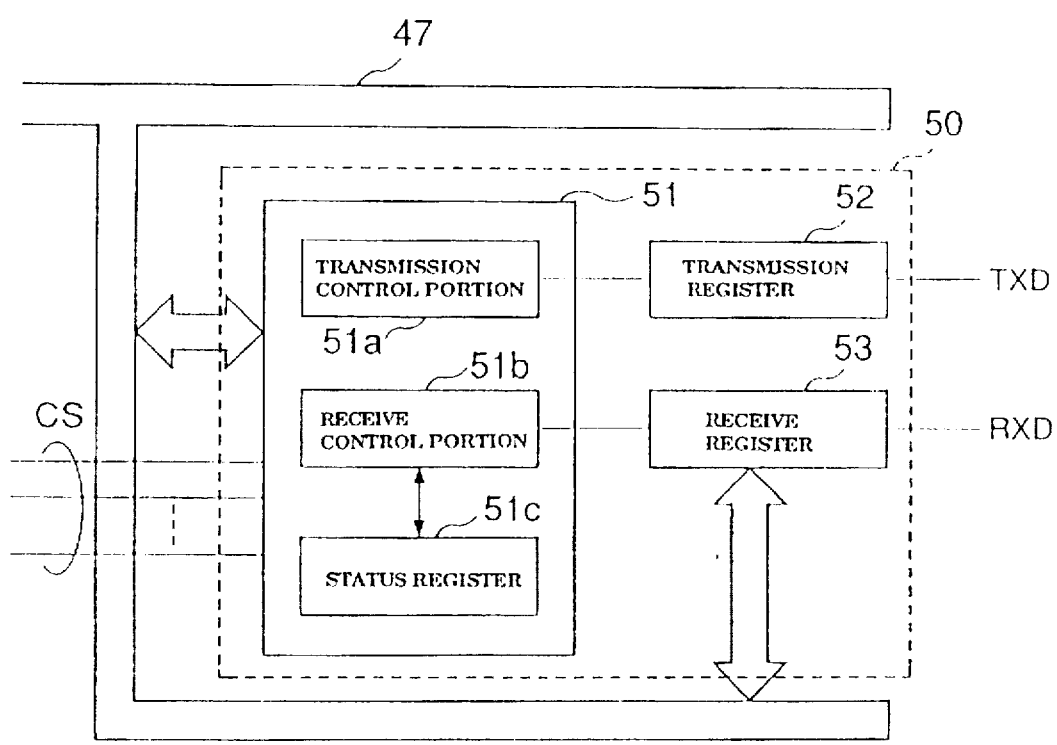
FIG. 4 is a block diagram showing an arrangement of a UART circuit of FIG. 3.

FIG. 4 is a block diagram showing an arrangement of the UART circuit 50 as shown in FIG. 3. The UART circuit 50 includes a control portion 51 for controlling the serial data transmission in response to the control signal CS issued from the controller 42. The control portion 51 comprises a transmission control portion 51a for controlling the transmission operation, a receive control portion 51b for controlling the receive operation and a status register 51c for storing an information of an internal status of the UART circuit 50 such as the transmission status, the receive status, etc. The transmission control portion 51a is connected to a transmission register 52 for temporarily storing therein the transmission data and transmitting the stored transmission data to the transmission line TXD. The receive control portion 51b is connected to a receive register 53 for temporarily storing therein the receive data from the receive line RXD.

Figure 1:
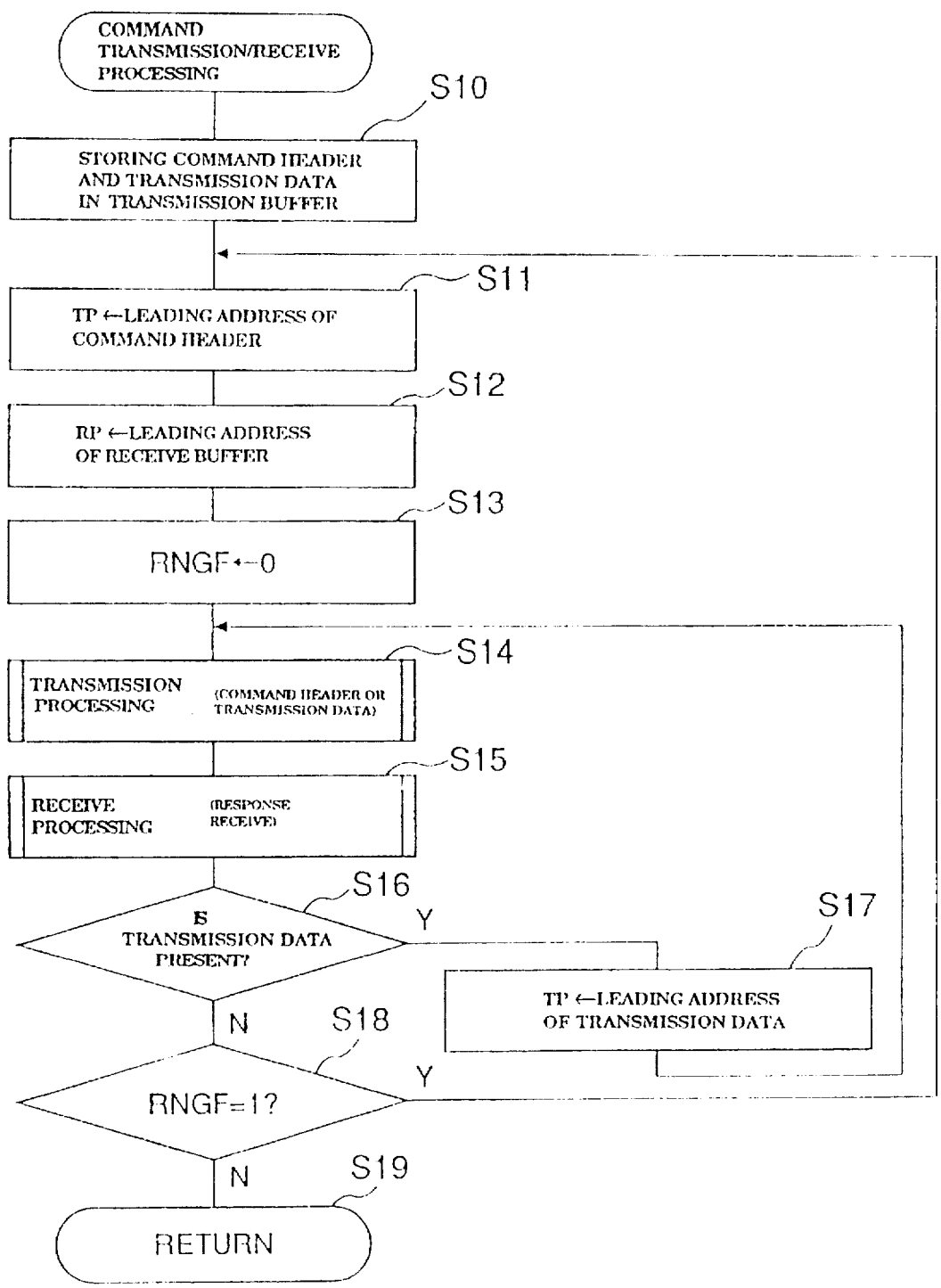
FIG. 1 is a flow chart showing a command transmission/receive processing according to a firs embodiment of the invention.

FIG. 1 shows a method of controlling the IC card reader/writer 40 according to the first embodiment of the invention and it shows a flow chart showing the command transmission/receive processing which is executed by the controller 42 of FIG. 3. A method of controlling the IC card reader/writer 40 of FIG. 3 will be now described with reference to the flow chart of FIG. 1.

According to the IC card reader/writer 40 of FIG. 3, when an instruction to execute the command processing for the IC card 70 is issued from the host unit 60, the controller 42 in the IC card reader/writer 40 prepares a command header of a specified command processing and a transmission data (only a command having the transmission data) and executes the command transmission/receive processing in the following manner.

In the command transmission/receive processing, under control of the controller 42, at first the command header and the transmission data are stored in the transmission buffer 43a in a step S10 and a leading address of the command header is assigned to the transmission pointer TP in the controller 42 in a step S11, and then a leading address of the receive buffer 43b is assigned to the receive pointer RP in the controller 42 in a step S12.

Successively, the receive NG flag RNGF in the controller 42 is set to 0 in a step S13, then a transmission processing of the command header is executed in a step S14. Thereafter a response receive processing is executed in a step S15 and the program goes to a step S16. In the step S16, it is checked whether the transmission data is present or not in order to judge whether the command processing which is presently executed is a command for receiving the data or a command for transmitting the data. If the transmission data is present, the program goes to a step S17, wherein a leading address of the transmission data in the transmission buffer 43a is assigned to the transmission pointer TP in the controller 42, and the program returns to the step S14. When the program returns to the step S14, the transmission processing of the transmission data is executed in the step S14, and the response receive processing is executed in the step S15, then the program goes to the step S16.

If the transmission data is not present in the step S16, e.g., the command is for receiving the data or the transmission data has been transmitted even if the transmission command is present, the program goes to a step S18, wherein the controller 42 judges whether the receive NG flag RNGF indicating the receive error is 1 or not. If the receive NG flag RNGF is 1, the program returns to the step S11, wherein the command transmission/receive processing is executed again from the beginning. Meanwhile, if the receive processing is normally terminated (RNGF=0) in the step S18, the program goes to a step S19, wherein the command transmission/receive processing is terminated.

Figure 5:
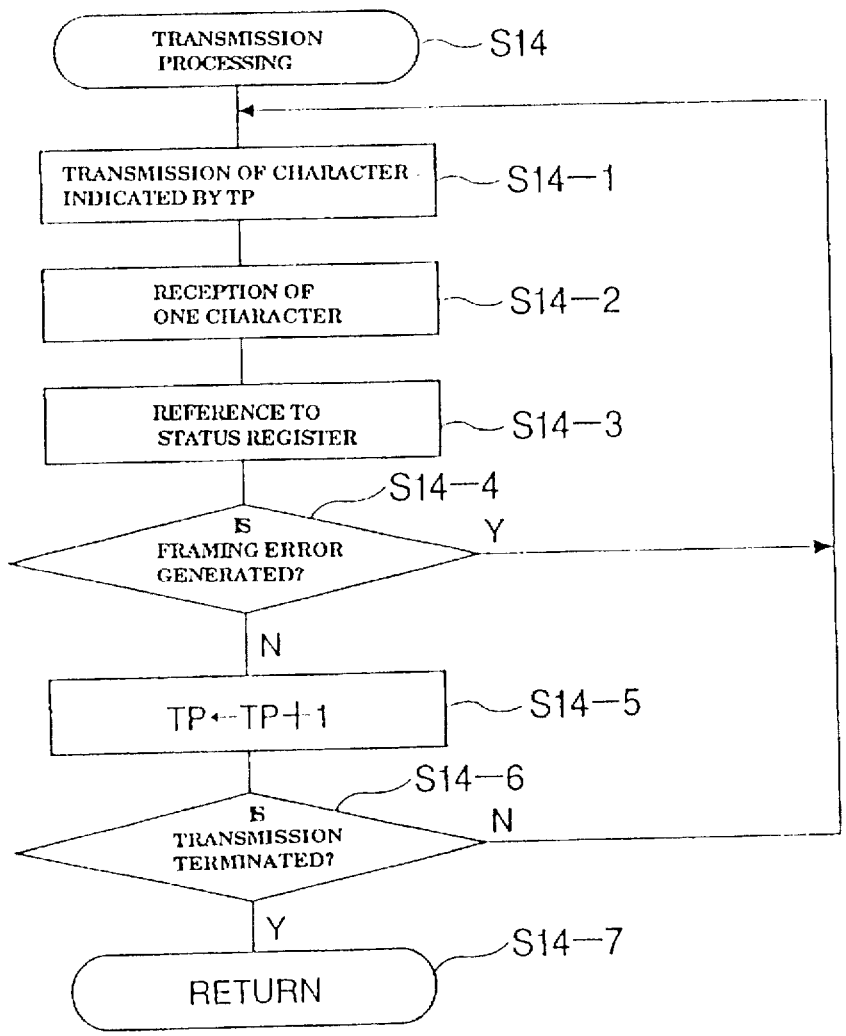
FIG. 5 is a flow chart showing the transmission processing of FIG. 1.

FIG. 5 is a flow chart showing the transmission processing in the step S14 as shown in FIG. 1. In this transmission processing, firstly, the controller 42 instructs the UART circuit 50 to transmit one character indicated by the transmission pointer TP to the IC card 70 by way of the SIO line L11 in a step S14-1. As a result, one character indicated by the transmission pointer TP is set in the UART circuit 50, and then the data etc. in the one character are serially consecutively transmitted to the IC card 70. The data in this character are consecutively transmitted to the IC card 70, for example, on a clock which is issued from the clock supply means 44 or a clock which is generated in the UART circuit 50 by dividing down the frequency of the clock issued from the clock supply means 44.

Since the transmission of the character uses the UART circuit 50, it is not at all necessary for the controller 42 to control counting bits among the character frames. That is, the transmission is automatically executed (without counting the bits) when the controller 42 merely sets a character to be transmitted in the transmission register 52 of the UART circuit 50.

The UART circuit 50 receives the echo back character which is returned by way of the receive line RXD which is directly connected to the transmission line TXD in a step S14-2. Since the UART circuit 50 is used for receiving the echo back character, it is enough for the controller 42 to wait for a receive interruption from the UART circuit 50 without executing any special processing.

Figure 2:
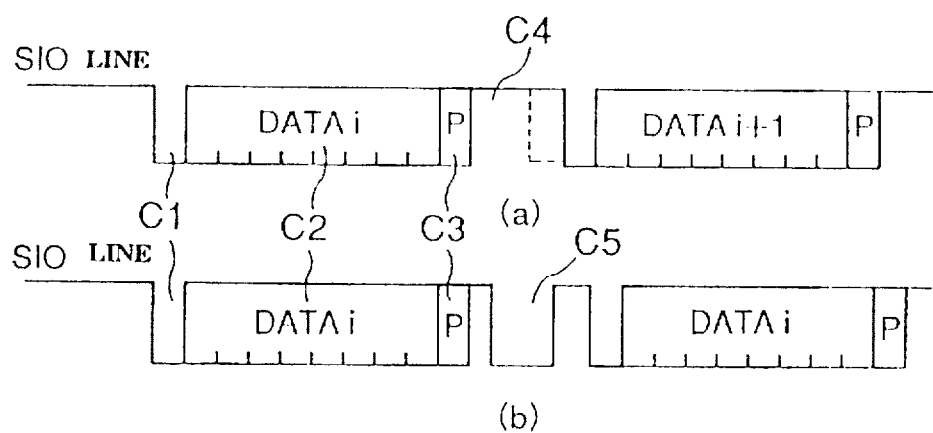
FIGS. 2(a) and 2(b) and are views showing a data transmission processing of an IC card meeting a T=0 protocol.

When the UART circuit 50 receives the echo back character, the controller 42 refers to the status register 51c in the UART circuit 50 in a step S14-3. Upon reception of the echo back character, in the step S14-4, the controller 42 checks whether the error signal C5 is output from the IC card 70 during the guard time as explained with reference to FIG. 2. That is, the IC card 70 generates a parity bit from the data of the character output from the IC card reader/writer 40, and collates the thus generated parity bit with a parity bit which is output from the IC card reader/writer 40. As a result of collation, if both parity bits are matched with each other, the controller 42 judges that the transmission data is not abnormal, whereby the IC card 70 does not output "L" level during the guard time. Accordingly, the SIO line L11 keeps "H" level during the guard time as shown in FIG. 2(a). (As mentioned previously, the SIO line L11 is normally pulled up to "H" level.) Such a status is called as a framing error non-present status, which means that the character output from the IC card reader/writer 40 is normally transmitted to the IC card 70.

If both parity bits are not matched with each other as a result of collation, the controller 42 judges that the transmission data is abnormal (the parity error is generated), whereby the IC card 70 outputs "L" level during the guard time. Consequently, the SIO line L11 is changed to "L" level during the guard time as shown in FIG. 2(b). Such a status is called a framing error present status, which means that the character output from the IC card reader/writer 40 is not normally transmitted to the IC card 70, namely, it means that a so-called framing error is generated.

If the framing error is generated in the step S14-4, the program returns to the step S14-1, wherein the controller 42 controls to transmit the same character again. If the framing error is not generated, the program goes to a step S14-5, wherein the controller 42 updates the transmission pointer TP therein, and judges whether the transmission is terminated or not in a step S14-6. If the transmission is not terminated, the program returns to the step S14-1 so as to transmit the next character. If the transmission is terminated in the S14-6, the program goes to a step S14-7, wherein the transmission processing is terminated.

The receive processing will be now described.

Figure 6:
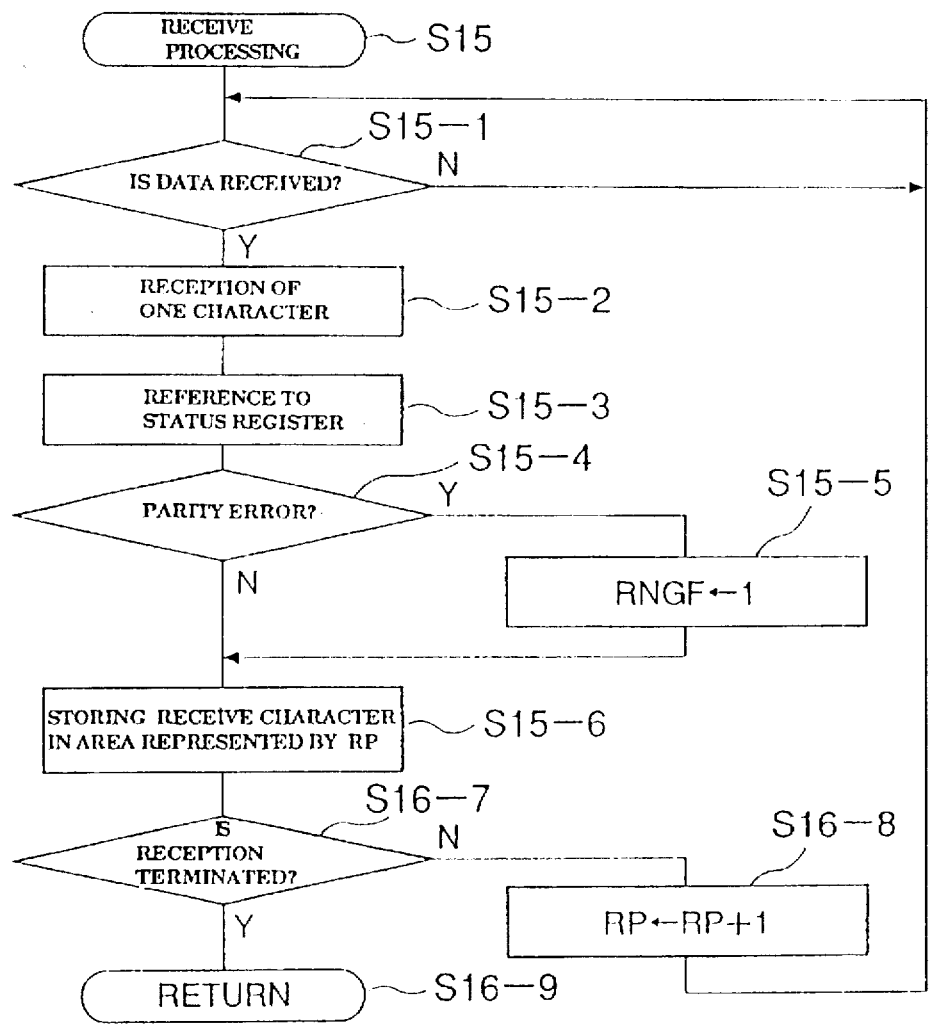
FIG. 6 is a flow chart showing the receive processing of FIG. 1.

FIG. 6 is a flow chart showing the receive processing in the step S15 in FIG. 1.

In this receive processing, the controller 42 is at a state of a receive waiting, i.e., a receive interrupt pending in the step S15-1. If the receive interrupt is generated, the controller 42 fetches the character from the receive register 53 provided in the UART circuit 50 in the step S15-2. (For example, the UART circuit 50 may be structured in that it outputs an interrupt signal to the controller 42 when all data output from the IC card 70 are transmitted to the receive register 53). Successively, the controller 42 refers to the status register 51c in the UART circuit 50 in the step S15-3, and the program goes to a step S15-4, wherein the controller 42 checks whether the parity error is generated or not.

If the parity error is generated in the step S15-4, the program goes to a step S15-5, wherein the controller 42 sets the receive NG flag RNGF to 1, and the program goes to a step S15-6. In the Step S15-6, the receive character is stored in an area of the receive buffer 43b represented by the receive pointer RP in the controller 42, and the controller 42 judges whether reception is terminated or not in a step S16-7. If reception is not terminated in the step S16-7, the controller 42 updates the receive pointer RP in a step S16-8, and the program returns to the step S15-1, wherein the program is standby until the next character is received. If reception is terminated in the step S16-7, the program goes to a step S16-9, wherein the receive processing is terminated.

As mentioned above, if the receive error (parity error) is generated in the receive processing in the step S15 as shown in FIG. 1, the receive NG flag RNGF in the controller 42 is set to 1 and it is referred to after execution of the receive processing in the step S15 during the execution of the command transmission/receiver processing as shown in FIG. 1. If the receive error is generated, the controller 42 starts again with the execution of the command transmission processing.

There are the following effects in the first embodiment.

Since a hardware can execute the transmission/receive processing of one character, the control which meets the T=0 protocol for the IC card 70 becomes very simple, and the capacity of the program to be stored in the ROM in the controller 42 can be small. Further, since the first embodiment uses the universal serial data transmission circuit such as the UART circuit 50 composed of an IC chip, it is not necessary to develop an exclusive universal serial data transmission circuit for the T=0 protocol.

The aforementioned effects are not obtained by merely using the serial data transmission circuit such as the UART circuit, etc. which outputs the data to be transmitted serially in response to a clock signal, etc. This is explained with reference to FIG. 10.

Figure 10:
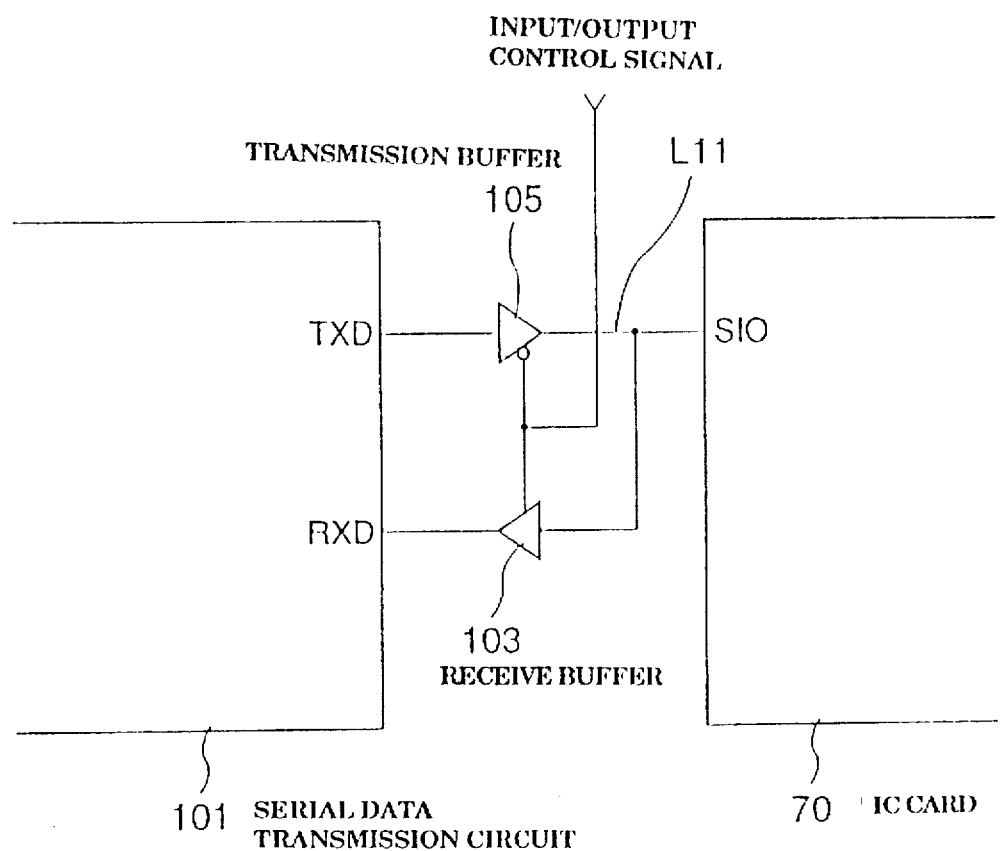
FIG. 10 is a view for explaining effects of the invention.

FIG. 10 exemplifies a case of the transmission processing where the data as shown in FIG. 2(b) is transmitted from a serial data transmission circuit 101 to the IC card 70. A transmission buffer 105 and a receive buffer 103 are generally controlled so that the former becomes ON and the latter becomes OFF during the transmission of one character comprising the start bit C1, data bits C2, parity bit C3 and the stop bits C4. That is, the SIO line L11 functions as an exclusive transmission line in the transmission processing and an exclusive receive line in the receive processing. The present invention is featured in that the transmission line TXD and the receive line RXD of the serial data transmission circuit 101 are directly connected to each other so that the SIO line L11 serves as the transmission/receive lines in the transmission processing.

According to the arrangement of the first embodiment, as shown in FIG. 2(b), when the character in which the parity error is generated is transmitted, the error signal C5 output from the IC card 70 during the guard time is transmitted to the receive line RXD. Accordingly, the IC card reader/writer 40 including the serial data transmission circuit 101 can recognize that the transmission data is not normally transmitted and can execute the data transmission again in a short period of time. Even if the character in which the parity error is generated is transmitted by the circuit 101 of FIG. 10, the error signal C5 output from the IC card 70 during the guard time is not transmitted to the receive line RXD because the receive buffer 103 is in the OFF status. Accordingly, the IC card reader/writer 40 including the serial data transmission circuit 101 can not recognize that the transmission data is not normally transmitted.

[Second Embodiment]

In the transmission processing in FIG. 5 showing the first embodiment of the invention, the transmission error (parity error) is recognized by the framing error, namely, by receiving the error signal output from the IC card during the guard time. However, if the falling of the error signal to "L" level due to the addition of a noise becomes dull, there is a possibility that the IC card reader/writer 40 judges that the transmission data is normally transmitted. In such a case, there is a possibility that the IC card reader/writer 40 wrongly recognizes the error signal C5 which has completely fallen to "L" level as the start bit C1, and recognizes "H" level succeeding to the "L" level as the data.

Accordingly, in the second embodiment, the IC card reader/writer 40 can recognize the error signal CS as the start bit and "H" level succeeding to "L" level of the error signal CS as the data (as mentioned above, the SIO line L11 is normally pulled up to "H" level. Accordingly, the SIO line keeps "H" level unless data is not transmitted thereto). That is, the IC card reader/writer 40 recognizes that the character after the error signal CS as an extension character and it executes an error recovery utilizing this extension character.

The second embodiment will be now described with reference to FIG. 7.

Figure 7:
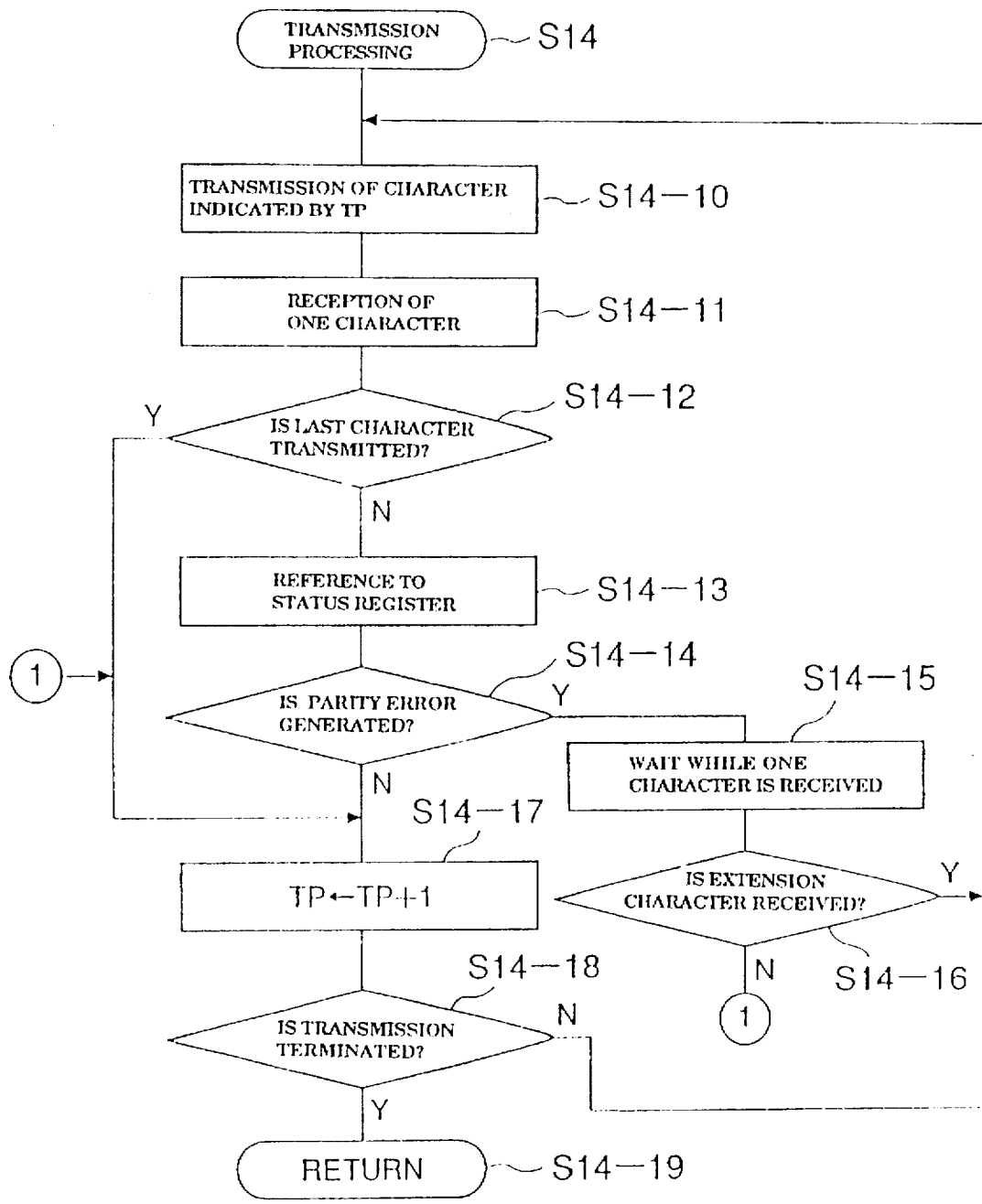
FIG. 7 is a flow chart showing a transmission processing according to a second embodiment of the invention.

FIG. 7 is a flow chart showing the transmission processing according to the second embodiment of the invention, i.e. a flow chart showing the transmission processing in the Step S14 as shown in FIG. 1.

In this transmission processing, first in a step S14-10, the controller 42 instructs the UART circuit 50 to transmit one character indicated by the transmission pointer TP to the IC card 70 by way of the SIO line L11. One character indicated by the transmission pointer TP is set in the UART circuit 50 and then, the data in the one character are serially consecutively transmitted to the IC card 70. The data in the one character are consecutively transmitted, for example, in response to the clock which is issued from the clock supply means 44 or a clock which is generated by dividing down the frequency of the clock issued from the clock supply means 44 in the UART circuit 50.

As mentioned above, since the transmission of the character uses the UART circuit 50, it is not at all necessary for the controller 42 to control such as counting bits among the character frames. That is, the transmission is automatically executed (without counting the bit interval) when the controller 42 merely sets a character to be transmitted in the transmission register 52 of the UART circuit 50.

The UART circuit 50 receives the echo back character which is returned by way of the receive line RXD which is directly connected to the transmission line TXD in a step S14-11. Since the UART circuit 50 is also used for receiving the echo back character, it is enough for the controller 42 to for a receive interruption from the UART circuit 50 without executing any special processing.

After the UART circuit 50 receives the echo back character, the program goes to a step S14-12, wherein the controller 42 judges whether the character which is transmitted in the step S14-10 is the last character of the transmission data (DENBUN P13, L14) or not. If the character which was transmitted in the step S14-10 is not the last character of the transmission data, the program goes to a step S14-13. Successively, the controller 42 refers to the status register 51c in the UART circuit 50, and checks whether the parity error is generated in the transmission data or not in a step S14-14. If the parity error is generated in the step S14-14, the program goes to a step S14-15, wherein the controller 42 waits (for example, by the time during which one bite data is transmitted) for an extension character having the error signal C5, which is output from the IC card 70, as the start bit, and it judges whether the extension character is received or not in a step S14-16. If the extension character is received in the step S14-16, the program returns to the step S14-10, wherein the IC card reader/writer 40 transmits the same character again. If the extension character is not received in the step S14-16, it is considered that the IC card 70 did not detect the parity error from the transmission data, so that the program goes to a step S14-17.

Meanwhile, if the transmission character is the last character in the step S14-12, or the parity error is not detected (in case of normal reception) in the step S14-14, the program goes to the step S14-17, wherein the controller 42 increments the transmission pointer TP by +1. Thereafter, the program goes to a step S14-18, where the controller 42 judges whether the transmission is terminated or not. If the transmission data is not terminated, the program returns to the step S14-10, wherein the IC card reader/writer 40 transmits the next character. If the transmission is terminated in the step S14-18, the program goes to a step S14-19, wherein the IC card reader/writer 40 terminates the transmission processing.

The reason why the last character is differentiated in processing from that of the other characters in the step S14-12 is that since in case of the transmission of the last character, a response character is returned from the IC card 70 after the last character is transmitted, the response character can not be distinguished from the extension character due to the error signal C5 of the parity error. Accordingly, in the method of controlling the IC card reader/writer of the second embodiment, an error recovery meeting the T=0 protocol cannot be executed in case of the last character of the transmission data but can be executed in case of other characters.

Since the receive processing of the second embodiment is executed in the same way as that of the first embodiment, the explanation of the receive processing is omitted.

According to the second embodiment, since it utilizes the parity error detected from the echo back of the transmission data and the error signal output from the IC card 70, which is different from the first embodiment utilizing the response (error signal) of the IC card 70 relative to the transmission data when the data is transmitted again, it has a further effect that the transmission data can be transmitted again with assurance in addition to the effect of the first embodiment.

[Third Embodiment]

Figure 8:
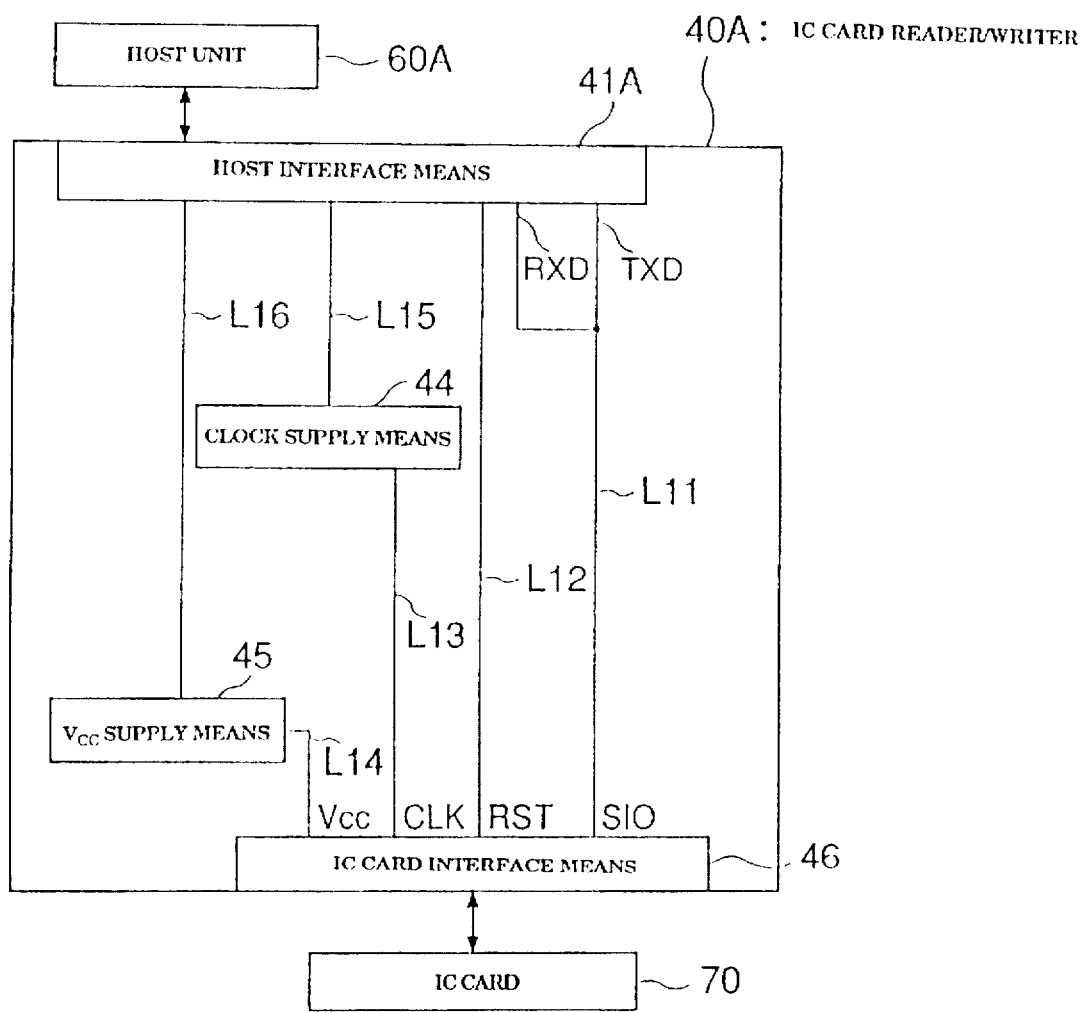
FIG. 8 is a block diagram showing an arrangement of an IC card reader/writer according to a third embodiment of the invention.

FIG. 8 is a block diagram showing an arrangement of an IC card reader/writer according to a third embodiment of the invention. Elements which are common to those in FIG. 3 are denoted at the same numerals.

Although the command transmission/receive processing is executed by the IC card reader/writer 40 in FIG. 3 according to the control method of the first and second embodiments, such a command transmission/receive processing can be implemented by an IC card reader/writer 40A having a simple circuit arrangement as shown in FIG. 8.

The IC card reader/writer 40A dispenses with the controller 42, transmission/receive buffer 43 and the UART circuit 50 in FIG. 3 but it has provided with a host unit 60A having the same functions as those of the aforementioned elements. That is, an IC card reader/writer 40A has a host interface means 41A which is connected to the host unit 60A comprising a personal computer, etc. The host interface means 41A comprises an RS-232C interface, etc. for executing a serial data transmission and it is connected to the transmission line TXD, receive line RXD, RST line L12, a clock control line L15 and a Vcc control line L16. The transmission line IXD and receive line RXD are directly connected to each other and the thus connected lines are connected to the SIO line L11. The clock control line L15 is connected to the clock supply means 44 which supplies the clock CLK to the IC card 70. The clock supply means 44 is connected to the CLK line L13. The Vcc control line L16 is connected to the Vcc supply means 45 which supplies the power potential Vcc to the IC card 70. The Vcc supply means 45 is connected to the Vcc line L14. The IC card interface 46 for executing the transmission and reception of signals between it and the IC card 70 is connected to the SIO line L11, the RST line L12, the CLK line L13 and the Vcc line L14.

Compared with the IC card reader/writer 40 in FIG. 3, the IC card reader/writer 40A does not have the same functions as those of the controller 42, transmission/receive buffer 43 and the UART circuit 50. That is, according to the third embodiment, the host unit 60A has the same functions as those of the controller 42, transmission/receive buffer 43 and the UART circuit 50, whereby the arrangement of the IC card reader/writer 40A can be simplified. In the third embodiment, it is also possible to execute the same command transmission/receive processing as the control methods of the first and second embodiments. That is, the control processing which is executed by the controller 42 inside the IC card reader/writer 40 in FIG. 3 can be executed by a control portion inside the host unit 60A in FIG. 8, so that it is possible to realize the IC card reader/writer 40A having a very simple arrangement.

[Fourth Embodiment]

Figure 9:
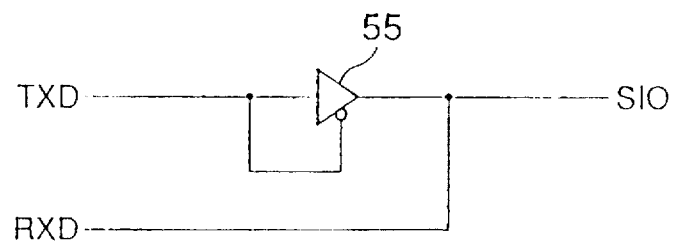
FIG. 9 is a view showing another example of an interconnection between a transmission line and a receive line in FIGS. 4 and 8.

FIG. 9 shows a fourth embodiment of the invention and it exemplifies interconnections between the transmission line TXD and SIO line L11 and between the receive line RXD and SIO line L11 in FIGS. 3 and 8.

In FIG. 9, the transmission line TXD is connected to the SIO line L11 by way of a gate means 55 (e.g., a tristate buffer).

The gate means 55 opens to permit the level of the SIO line L11 to fall in "L" level when the transmission data is in "L" level alone. Accordingly, it is possible to prevent the data transmitted from the IC card 70 from influencing the transmission line TXD at the time of reception. That is, the fourth embodiment of the invention is valid in a case where the transmission line TXD does not become high in impedance at the time other than the transmission time (e.g., at the time of reception).

As mentioned in detail above, the invention is not limited to the aforementioned embodiments but it can be modified variously. There are following modifications.

(1) For example, the transmission/receive buffer 43 and UART circuit 50 are provided outside the controller 42 in FIG. 3, but the former can be contained in the latter.

(2) For example, the clock supply means 44 and Vcc supply means 45 are structured to be controlled by the host unit 60A by way of the clock control line L15 and Vcc control line L16 respectively connected to the host interface means 41A in FIG. 8, it may be structured that the clock CLK and the power supply Vcc are supplied to the IC card 70 regardless of the host interface means 41A when the IC card 70 is mounted on the IC card reader/writer 40A or the clock CLK and the Vcc are always supplied to the IC card 70.

(3) For example, although the error recovery of the T=0 protocol is implemented merely by detecting the parity error and the extension character in FIG. 9, the method of detecting the framing error in the first embodiment may be used together with the above mentioned error recovery.

I claim:

1. A method of controlling an IC card reader/writer for executing a command processing for an IC card having a serial input/output line, the IC card reader/writer having a serial data transmission circuit which has a transmission line and a receiving line for executing a parallel/serial conversion between transmission data and received data, the method comprising the steps of:

(a) directly connecting the transmission line to the receiving line and the serial input/output line or connecting the transmission line to the receiving line and the serial input/output line through a gate circuit;

(b) transmitting a character frame from the transmission line to the receiving line and the serial input/output line;

(c) receiving an echo back character at the receiving line;

(d) transmitting the character frame again when the echo back character indicates that an error exists in the character frame received at the serial input/output line;

(e) transmitting a next character frame when the echo back character indicates that an error does not exist in the character frame received at the serial input/output line;

(f) receiving a character frame from the serial input/output line at the receiving line; and (g) executing said steps (b) to (f) after said step (f) is terminated when an error exists in the character frame received at the receiving line.

2. A method according to claim 1, wherein the errors of said steps (d) and (e) are parity errors.

3. A method according to claim 1, wherein the error of said step (g) is a parity error.

4. A method according to claim 1, wherein the echo back character comprises data returned from the transmission line and the serial input/output line.

5. A method of controlling an IC card reader/writer for executing a command processing for an IC card having a serial input/output line, the IC card reader/writer having a serial data transmission circuit which has a transmission line and receiving line for executing a parallel/serial conversion between transmission data and received data, the method comprising the steps of:

(a) directly connecting the transmission line to the receiving line and the serial input/output line or connecting the transmission line to the receiving line and the serial input/output line through a gate circuit;

(b) transmitting a character frame from the transmission line to the receiving line and the serial input/output line;

(c) receiving an echo back character at the receiving line;

(d) transmitting the character frame again when the echo back character indicates that an error exists and an extension character is received, the extension character including a start bit defined by an error signal from said IC card;

(e) transmitting a next character frame when the echo back character indicates that an error exists and the extension character is not received;

(f) receiving a character frame from the serial input/output line at the receiving line; and (g) executing said steps (b) to (f) after said step (f) is terminated when an error exists in the character frame received at the receiving line.

6. A method according to claim 5, wherein the error of said step (d) is a parity error.

7. A method according to claim 5, wherein the error of said step (g) is a parity error.

8. A method according to claim 5, wherein the echo back character comprises data returned from the transmission line and the serial input/output line.

9. A method according to claim 5, wherein said steps (b) to (e) are performed when the transmission data is not a last data.

10. A method of controlling an IC card reader/writer for executing a read operation and a write operation for an IC card, the IC card reader/writer having a serial input/output line and serial data transmission means for executing a parallel/serial conversion for transmission data and reception data, the serial data transmission means having a transmission line and a reception line, the transmission line, the reception line and the serial input/output line being connected to each other directly, or through a gate circuit, said method comprising:

(a) transmitting data to the IC card from the serial data transmission means via the serial input/output line;

(b) receiving echo back data which is returned from the transmission line via the reception line;

(c) transmitting the data again when the echo back data indicates that an error exists in the data transmitted via the serial input/output line;

(d) transmitting next data when the echo back data indicates that an error does not exist in the data transmitted via the serial input/output line;

(e) receiving data from the IC card at the serial data transmission means via the serial input/output line;

(f) executing steps (a) to (e) again after step (e) is terminated when an error exists in the data received from the IC card at the serial data transmission means via the serial input/output line.

11. A method of controlling an IC card reader/writer for executing a read operation and a write operation for an IC card, the IC card reader/writer having a serial input/output line and serial data transmission means for executing a parallel/serial conversion for transmission data and reception data, the serial data transmission means having a transmission line and a reception line, the transmission line, the reception line and the serial input/output line being directly connected to each other, said method comprising:

(a) transmitting data to the IC card from the serial data transmission means via the serial input/output line;

(b) receiving echo back data which is returned from the transmission line via the reception line;

(c) determining whether the data transmitted is a last character;

(d) determining whether the echo back data indicates that an error exists in the data transmitted via the serial input/output line when the data is not the last character;

(e) determining whether an extension character is received when an error exists;

(f) transmitting the data again when the data is not the last character, an error exists and the extension character is received;

(g) transmitting next data when the data is the last character;

(h) transmitting next data when the data is not the last character and an error does not exist;

(i) transmitting next data when the data is not the last character, an error exists and the extension character is not received;

(j) receiving data from the IC card at the serial data transmission means via the serial input/output line;

(k) executing steps (a) to (j) again after step (j) is terminated when an error exists in the data received from the IC card at the serial data transmission means via the serial input/output line.

* * * * *